(12) United States Patent
Folaron et al.

(10) Patent No.: US 10,843,393 B2
(45) Date of Patent: Nov. 24, 2020

(54) INJECTION MOLDING APPARATUS AND METHOD OF USE

(71) Applicant: Universal Smart Inc., Gerry, NY (US)

(72) Inventors: Robert Folaron, Colorado Springs, CO (US); Scott Sando, Gerry, NY (US)

(73) Assignee: UNIVERSAL SMART INC., Gerry, NY (US)

( * ) Notice: Subject to any disclaimer, the term of this patent is extended or adjusted under 35 U.S.C. 154(b) by 0 days.

(21) Appl. No.: 16/572,967

(22) Filed: Sep. 17, 2019

(65) Prior Publication Data

US 2020/0009775 A1 Jan. 9, 2020

Related U.S. Application Data

(62) Division of application No. 15/495,367, filed on Apr. 24, 2017, now abandoned.
(Continued)

(51) Int. Cl.
*B29C 45/17* (2006.01)
*B29C 45/28* (2006.01)
(Continued)

(52) U.S. Cl.
CPC .......... *B29C 45/1735* (2013.01); *B29C 45/03* (2013.01); *B29C 45/14065* (2013.01);
(Continued)

(58) Field of Classification Search
CPC ..... B29C 45/1735; B29C 45/16; B29C 45/03; B29C 2945/76568
See application file for complete search history.

(56) References Cited

U.S. PATENT DOCUMENTS 3,305,892 A * 2/1967 Heider ............... B29C 45/36
425/532
3,893,644 A 7/1975 Drazick
(Continued)

FOREIGN PATENT DOCUMENTS

| CN | 1045244 A | 9/1990 |
|---|---|---|
| JP | 55561438 A | 5/1980 |

OTHER PUBLICATIONS

Non-Final Office Action dated Apr. 10, 2019 issued in U.S. Appl. No. 15/495,367.
(Continued)

*Primary Examiner* — Peter L Vajda
*Assistant Examiner* — Caroline Montiel
(74) *Attorney, Agent, or Firm* — Voz Patents, LLC

(57) ABSTRACT

The present invention surrounds an apparatus and method for the use in injection molding of articles of manufacture using an injection molding apparatus having a valve-gate pin or a plurality of valve-gate pins for actuation to extend and retract from a cavity within an injection mold. The valve-gate pin may have a retention feature or retention features configured for the retention of molded parts such that the retraction or extension of the valve-gate pin provides part removal from an associated injection mold. Further, the valve-gate pin may have a feature or features to facilitate the injection of fluids, gases or particles during or after the primary injection process. Additionally, a plurality of such valve-gate pins may be employed within each mold cavity, or within each valve-gate actuation system.

12 Claims, 10 Drawing Sheets

Related U.S. Application Data

(60) Provisional application No. 62/326,655, filed on Apr. 22, 2016.

(51) Int. Cl.
*B29C 45/03* (2006.01)
*B29C 45/14* (2006.01)
*B29C 45/16* (2006.01)
*B29C 45/76* (2006.01)

(52) U.S. Cl.
CPC .......... *B29C 45/16* (2013.01); *B29C 45/2806* (2013.01); *B29C 45/76* (2013.01); *B29C 2045/14139* (2013.01); *B29C 2945/76568* (2013.01)

(56) References Cited

U.S. PATENT DOCUMENTS

| | | | |
|---|---|---|---|
| 4,274,823 A | 6/1981 | Stanciu et al. | |
| 4,412,806 A | 11/1983 | Gaiser et al. | |
| 4,530,654 A | 7/1985 | Rose | |
| 4,579,520 A * | 4/1986 | Gellert | B29C 45/2806 425/549 |
| 4,653,997 A | 3/1987 | Sheffield et al. | |
| 4,917,594 A * | 4/1990 | Gellert | B29C 45/1735 264/328.15 |
| 5,316,707 A | 5/1994 | Stanciu et al. | |
| 5,423,672 A | 6/1995 | Gordon | |
| 5,492,658 A | 2/1996 | Ohno et al. | |
| 5,820,803 A * | 10/1998 | Hashimoto | B29C 45/261 264/154 |
| 6,019,918 A | 2/2000 | Guergov | |
| 6,872,069 B2 | 3/2005 | Starkey | |
| 7,306,455 B2 | 12/2007 | Dewar et al. | |
| 2002/0086086 A1 | 7/2002 | Doyle et al. | |
| 2003/0164462 A1 | 9/2003 | Kim et al. | |
| 2005/0046083 A1* | 3/2005 | Dewar | B29C 45/2806 264/328.1 |
| 2006/0065998 A1* | 3/2006 | Takigawa | B29C 33/444 264/132 |
| 2007/0036878 A1 | 2/2007 | Goodenough et al. | |
| 2007/0222111 A1 | 9/2007 | Hussain et al. | |
| 2012/0248644 A1 | 10/2012 | Antunes et al. | |

OTHER PUBLICATIONS

Search History for PCT Application No. PCT/US17/29174 to Folaron, et al., ISA communication dated Oct. 2, 2017.
Search Report for PCT Application No. PCT/US17/29174 to Folaron, et al., ISA communication dated Oct. 2, 2017.
Final Office Action issued in U.S. Appl. No. 15/495,367 dated Oct. 10, 2019.
First Office Action dated Aug. 4, 2020 issued in Chinese Application No. 201780024991.9 with Translation.

* cited by examiner

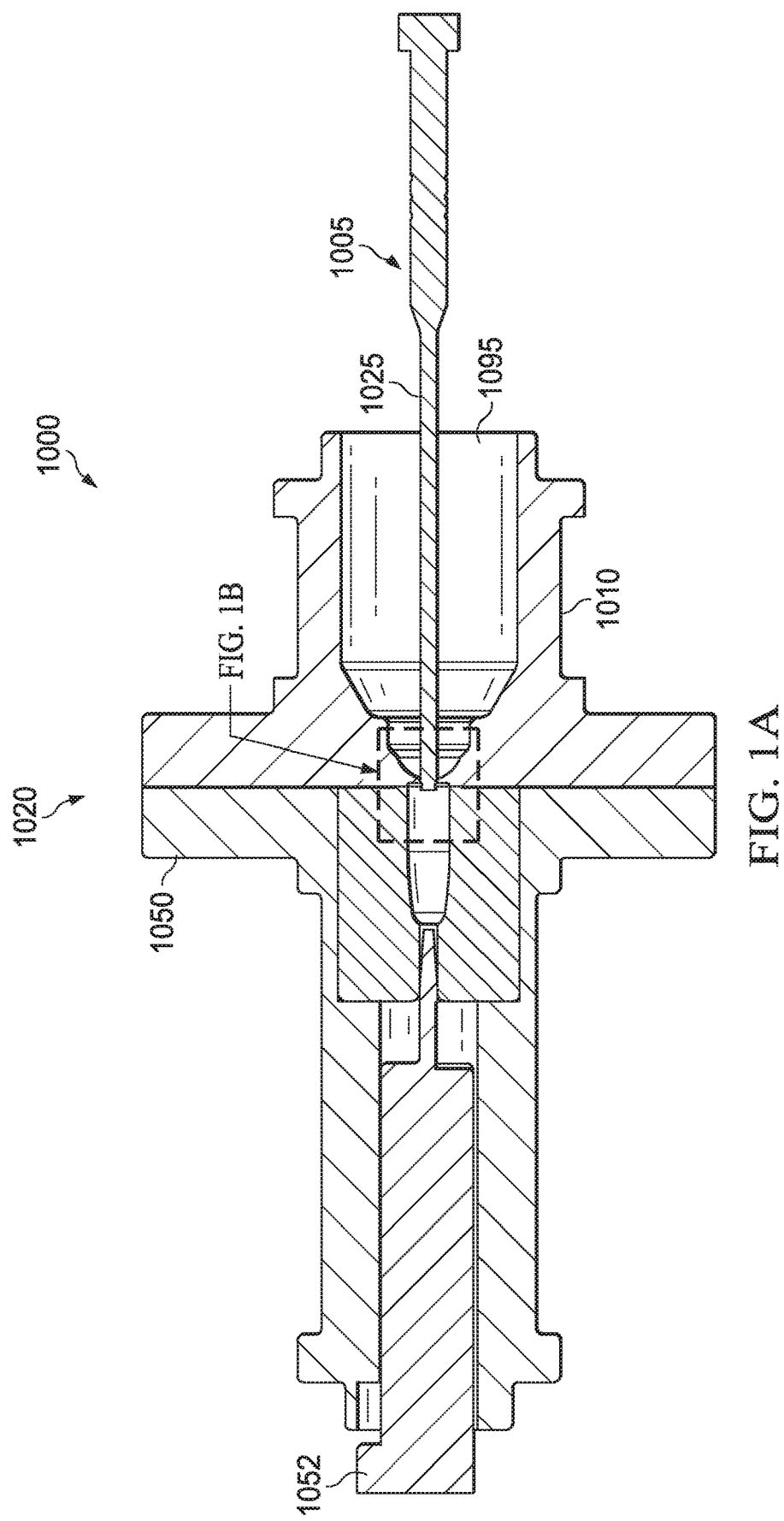

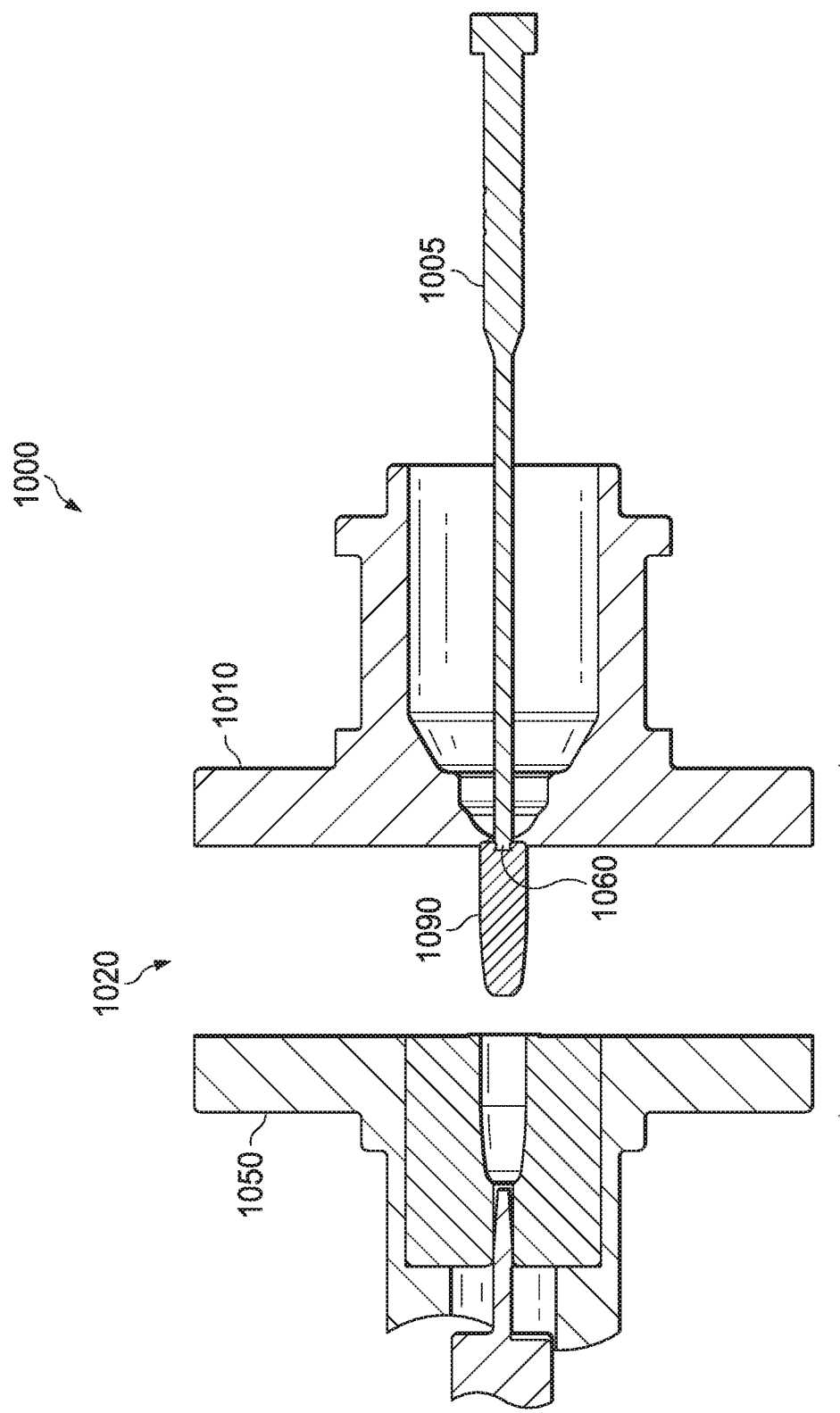

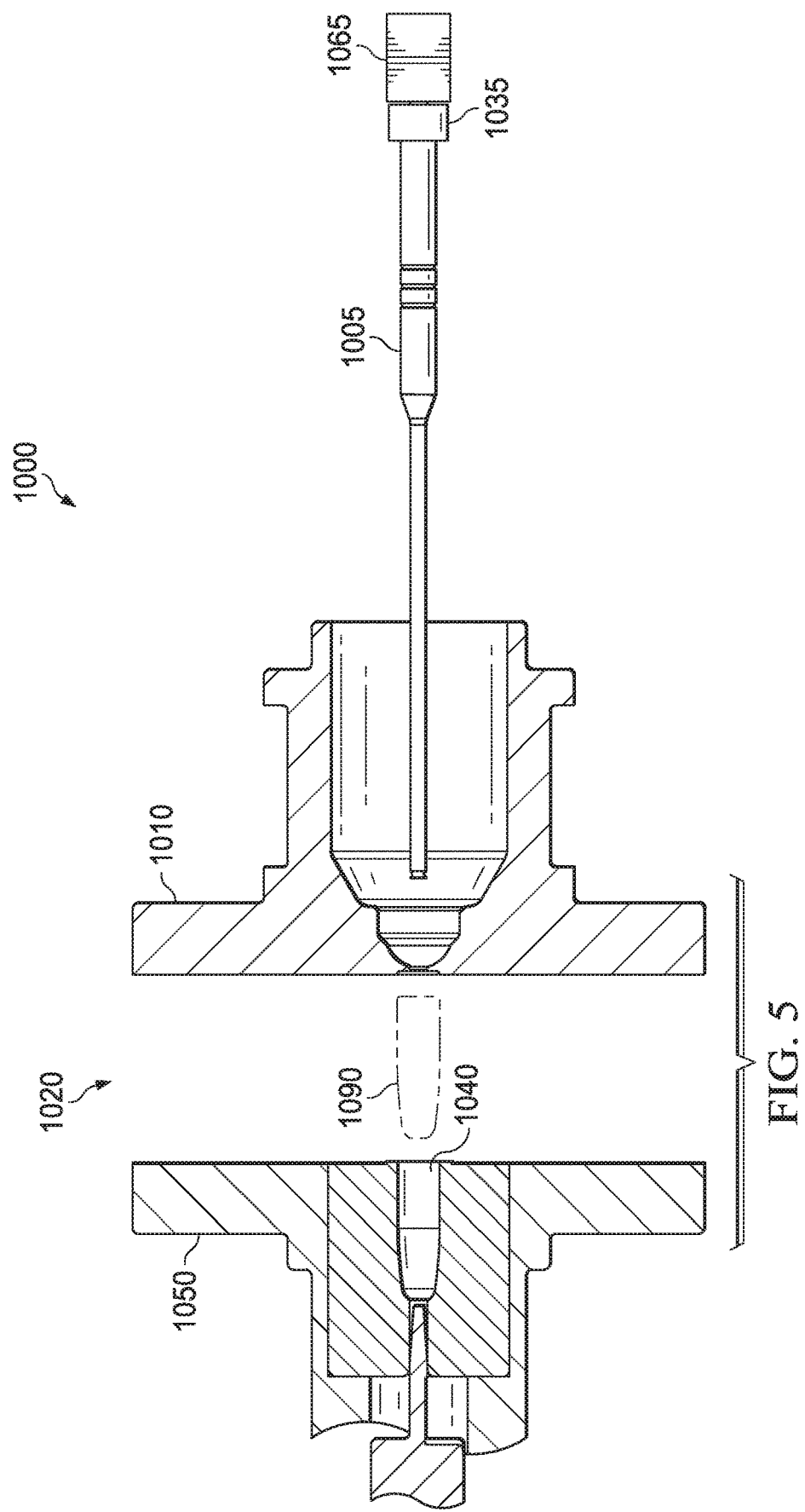

INJECTION MOLDING APPARATUS AND METHOD OF USE

CROSS REFERENCE TO RELATED APPLICATIONS

This application is a Divisional of U.S. patent application Ser. No. 15/495,367 entitled "Injection Molding Apparatus and Method of Use"—filed Apr. 24, 2017, which claims benefit to U.S. Provisional Patent Application No. 62/326,655, entitled "Injection Molding Apparatus and Method of Use"—filed Apr. 22, 2016, which are incorporated by reference in its entirety for all purposes.

FIELD OF THE INVENTION

The present invention relates to an apparatus and process to decrease maintenance and increase process efficiency surrounding injection molding.

BACKGROUND OF THE INVENTION

The field of injection molding surrounds a manufacturing process for producing parts by injecting material into a mold having at least two adjoining portions creating a specifically designed cavity resembling the form of the desired part to be made. After a part is designed, a mold is manufactured from any suitable material, usually metals, and machined to form the features of the desired part. This mold is usually affixed to an injection molding machine which uses the mold to produce the part as designed. The injection molding process typically fills the cavity with a liquefied material which is then cooled, cured, and solidified to produce the part as designed.

An injection mold typically has two or more parts. A first side, sometimes referred to as the A-side, is the side from which the material is typically injected through an injector or valve-pin and into the cavity of the mold. The second side, sometimes referred to as the B-side, typically retains the part when the mold is open after the material injection process.

A typical injection molding process involves a series of steps. A first step of clamping, secures the first side to the second side in a manner that aligns the cavity of the A-side with the cavity of the B-side in preparation for the following steps. Following the clamping step, an injecting step involves the preparation and delivery of material under pressure into the cavity of the mold. When the material is delivered into the cavity, the material for injection is initially fed into a heating chamber prior to being forced into the cavity. Material is delivered into the cavity through a flow control system, often through a valve-gate system, such as disclosed by U.S. Pat. No. 5,948,450 to Swenson et al., the entirety of which is herein incorporated by reference. Such valve-gate systems are configured with a valve-pin that opens/closes flush with the outer boundary of the mold cavity to prevent interference with part molding. As the material is injected into the cavity of the mold, a vent is commonly used to allow the equalization of gasses to be purged from the cavity. Following the injecting step, a dwelling step involves a pause in the injection process. During the dwelling step, maintaining the material motionless under pressure, ensures that all voids of the cavity are filled with the injected material. A cooling step then allows the material to cool and harden to the configuration of the mold cavity. The mold is then opened, and the part removed. In many scenarios, an additional step of removing the part from the opened mold is required. Part removal is often performed by a machine attendant or using a mechanism referred to as an ejector pin or knock-out pin.

Ejector pins, as used in the injection molding industry, provide the functionality of ejecting or removing molded parts from a mold without the direct physical involvement of a machine operator or attendant. Ejector pins have linear or rotational actuation functionality and are typically installed in the second side, or B-side, of the mold. When the mold is opened during the opening step, the ejector pins are actuated to extend the ejector pins outward from behind the molded part. The actuation of the ejector pins pushes the part away from the mold which releases the part and allows it to fall away from the mold.

SUMMARY OF THE INVENTION

In the field of injection molding, a large portion of the related mold maintenance is directly associated with the maintenance of ejector pins. Some injection molding manufacturers attribute 30-40% of the cost of mold maintenance to the maintenance of ejector-pins and ejector-pin systems. When a mold undergoes maintenance, this typically includes down-time for the injection molding machine to which the mold is affixed. Ejector pin systems are often the cause of excess wear and tear for molds and as a result, molds are commonly made from steel, resulting in a heavy mold requiring costly machining to prepare.

Existing technologies surrounding the removal or ejection of a part from an injection mold include U.S. Pat. No. 6,872,069 to Starkey, U.S. Pat. No. 4,412,806 to Gaiser and Niepoky, U.S. Pat. No. 3,893,644 to Drazick, and U.S. Pat. No. 5,492,658 to Ohno et al., all of which are herein incorporated by reference in their entirety.

The elimination of ejector pins decreases the need for mold maintenance and decreases injection molding machine downtime. The elimination of ejector-pins also serves to allow the manufacture of injection molds from alternative materials from traditionally used steel, and eliminates injection mold complexity amongst other advantages.

Certain embodiments of the invention provide functionality for the mechanical extraction of a molded part from an injection mold while eliminating the need for ejector pins. The elimination of ejector pins serves to reduce mold preparation cost and decreases mold maintenance frequency.

The invention as presented eliminates the necessity of an ejector pin by using a valve-gate pin for part extraction. In certain embodiments, a valve-gate pin is installed on a first side of the mold with a distal portion of the valve-gate pin protruding into the cavity of the mold cavity. The valve-gate pin provides both the functionality of controlling flow of the liquefied material into the cavity of the mold as well as extracting the part from the mold. When the part is molded, the part forms and solidifies around the protruding portion of the valve-gate pin, thereby affixing the part to the protruding portion of the valve-gate pin. When the mold is opened, the part is pulled away from the second side of the mold by the connection of the part to the valve-gate pin, thus essentially retaining the part in the first side of the mold. Once the connection between the part and the valve-gate pin is broken, the part may be removed. The valve-gate pin may be further actuated to retract or extend, to provide self-release of the part from the valve-gate pin.

The apparatus and method of use surrounding the invention may be used for pre-existing injection molding tools that use valve-gate pins to control the flow of liquid material into the mold cavity. Valve-gate pins of existing molds may be replaced with multi-functional valve-gate pins for the delivery of molding material and to extract the molded part from a mold, eliminating the need for ejection pins.

The present invention surrounds an apparatus and method for the improvement of the field of injection molding through the elimination of ejection pins by using valve-gate pins. Valve-gate pins as discussed herein provide the functionality of controlling the injection of material into a cavity of a mold through an aperture as well as extracting the part from the mold.

Certain embodiments of the invention allow the capability to precisely and repeatedly control the position, speed and flow aperture characteristics of a valve-gate pin. The precise control of the position of a valve-gate pin surrounding extension and retraction allows the finite control and adjustability of the location of the valve-gate pin throughout the injection molding process. The adjustment of flow aperture characteristics of the valve-gate pin allows for optimization of flow characteristics for the parts being made after the injection mold has been manufactured. In such embodiments, the valve-gate pin may be used to influence the speed and flow characteristics of the material entering the mold cavity, affecting part formation and effectiveness of the valve-gate pin to develop a desired connection to the molded part.

Certain embodiments of a valve-gate pin as described in the present application further comprise pathway through the length or partial length of the valve-gate pin, typically consistent with a central axis of the valve-gate pin. In such embodiments, the pathway provides the ability to inject or push a fluid, or other material, into the cavity within the injection mold. Such practice of injecting a gaseous fluid in the cavity of the injection mold with molten fluid, such as a polymer, is known as gas-assist injection molding such as disclosed by U.S. Pat. No. 6,019,918 to Guergov, the entirety of which is herein incorporated by reference. Such a pathway may also be used for gas ejection of a part such as disclosed in U.S. Pat. No. 4,653,997 to Sheffield et al., the entirety of which is herein incorporated by reference.

In certain embodiments, a part may still be retained by a first side of an injection mold after the retraction of a valve-gate pin. In such embodiments, it may be further desired to extend the valve-gate pin such that it once again protrudes into the injection mold cavity. The extension of the valve-gate pin following retraction serves to push the part away from the first side of the mold and release the part from the mold. The extension of the valve-gate pin following retraction may also serve to re-seal the part if additional fluids are injected through the valve-gate pin.

Certain embodiments of the protruding portion of the valve-gate pin comprise a retention feature. Certain embodiments of a valve-gate pin comprise a retention feature having an undercut around the perimeter of the protruding portion of the valve-gate pin. An undercut in this situation provides increased connection strength between the part and the valve-gate pin following part molding. The retention feature of a valve-gate pin may comprise any form, dimension, depth or profile. In certain embodiments, it may be desired to have a plurality of undercuts in the protruding portion of the valve-gate pin. A retention feature as disclosed herein may comprise any form or feature known to those skilled in the art to provide an increased connection strength between a part and a valve-gate pin, including but not limited to, annular undercut features, helical undercut features, threaded features. Certain embodiments of a valve-gate pin comprise retention features that exceed a diameter of a portion of the valve-gate pin which protrudes into the cavity of an injection mold.

The configuration of a retention feature of a valve-gate pin depends upon the part for molding as well as the material used in the injection molding of the part. For instance, in the injection molding of thermoplastic plastics, it is possible to obtain a molded product with the desired dimensions using the mold shrinkage phenomenon. Mold shrinkage is the phenomenon where the volume of the flowable material filled inside the cavity of a mold shrinks at the same time as being cooled and solidifying. The extent of this shrinkage is commonly referred to as a molding shrinkage factor. The value of the molding shrinkage factor is generally a number in the range of about 0.02% to 2%. It will be appreciated by those skilled in the art that the molding shrinkage associated with a given injection mold and part is affected by type of molding material, internal surface temperature of the injection mold. In embodiments, such that a retention feature comprises an undercut, it may be desired to size the undercut in accordance with the molding shrinkage generally to approximately 75% of the determined shrinkage dimension. For instance, if mold shrinkage is determined to be 0.203 mm (0.008 in), it may be desired to size the undercut to be 0.152 mm (0.006 in) from a diameter of the protruding portion of the valve-gate pin. However, in embodiments such that a retention feature comprises threaded features, it may be desired to size the depth of the threaded features to approximately 100% of the determined shrinkage dimension. For instance, if mold shrinkage is determined to be 0.203 mm (0.008 in), it may be desired for depth thread to be 0.203 mm (0.008 in) from a diameter of a protruding portion of a valve-gate pin.

The inventive concept surrounding an injection molding apparatus having a valve-gate pin may be used in injection molding applications as well as known to be applicable by those skilled in the art. Furthermore, it will be appreciated that the inventive concept as disclosed may be used individually in applications, as a plurality of units controlled independently within a system, or a plurality of units controlled in concert within a system. Such control may be performed in an automated manner such as disclosed by U.S. Pat. No. 5,316,707 to Stanciu et al., herein incorporated by reference in its entirety. A system in which a plurality of valve-gate pins is used may comprise an injection mold having a cavity, an injection mold having a plurality of cavities, or a plurality of injection molds. It will be further appreciated that the features of a valve-gate pin as discussed herein, such as retention features, and a pathway, may be used independently in concert while remaining in-line with the inventive concepts as discussed herein. In embodiments comprising a plurality of valve-gate pins operating in a system, it will be appreciated that certain valve-gate pins may be used for the purposes of part retention and part extraction, while other valve-gate pins are used to control the flow of material into an injection mold for an injection molding process.

DETAILED DESCRIPTION OF CERTAIN EMBODIMENTS

Figure 1B:
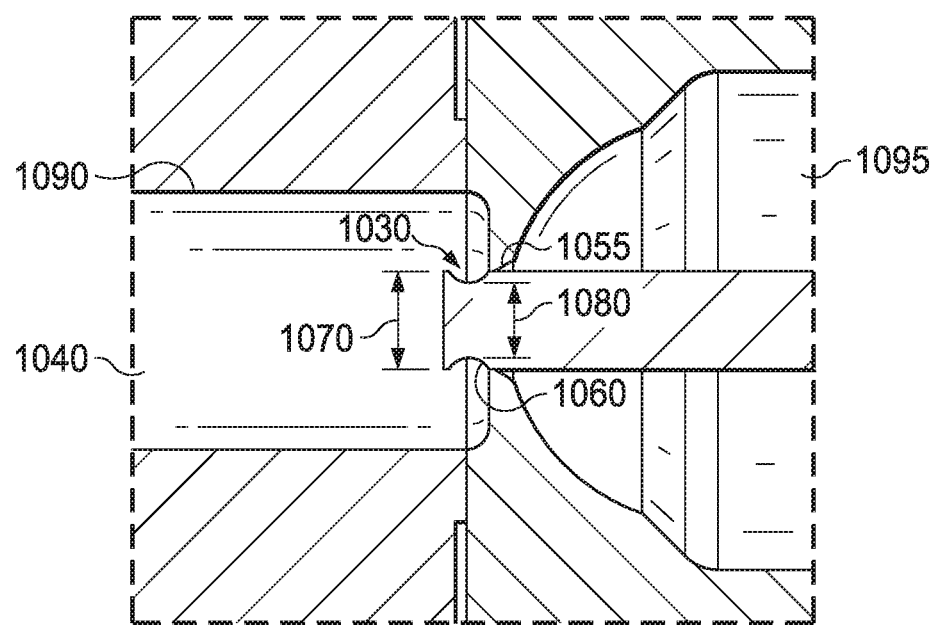
FIG. 1A A cross-sectional view of an embodiment of an injection molding apparatus FIG. 1B A cross-sectional detail view of an embodiment of an injection molding apparatus FIG. 2 A perspective view of an embodiment of a valve-gate pin FIG. 3A A cross-sectional detail view of an embodiment of an injection molding apparatus with a valve-gate pin in an open position FIG. 3B A cross-sectional detail view of an embodiment of an injection molding apparatus with a valve-gate pin in a closed position FIG. 4 A cross-sectional view of an embodiment of an injection molding apparatus with a first-side of an injection mold separated from a second side of an injection mold FIG. 5 A cross-sectional view of an embodiment of an injection molding apparatus with a first-side of an injection mold separated from a second side of an injection mold FIG. 6A A detailed view of an embodiment of a valve-gate pin showing an embodiment of a retention feature FIG. 6B A detailed view of an embodiment of a valve-gate pin showing an embodiment of a retention feature FIG. 6C A detailed view of an embodiment of a valve-gate pin showing an embodiment of a retention feature FIG. 6D A detailed view of an embodiment of a valve-gate pin showing an embodiment of a retention feature FIG. 7 A cross-sectional view of an embodiment of an injection molding apparatus with a first-side of an injection mold separated from a second side of an injection mold FIG. 8 A cross-sectional view of an embodiment of an injection molding apparatus FIG. 9 An embodiment of an injection molding method FIG. 10 An embodiment of an injection molding method

Certain embodiments of the present invention, shown in FIG. 1A and FIG. 1B, surrounds an injection molding apparatus 1000 comprising a valve-gate pin 1005 installed on a first side 1010 of an injection mold 1020. The valve-gate pin 1005, having a shaft 1025, further comprises a first end 1030 for protruding into a cavity 1040 defined by a first side 1010 and a second side 1050 of the injection mold, with the second side having a vent mechanism 1052. The first end 1030 of the valve-gate pin comprises a retention feature 1060. The retention feature 1060 comprises a first dimension 1070 and a second dimension 1080. The first dimension, proximate to the first end 1030 of the valve-gate pin, is larger than the second dimension 1080. Due to the retention feature 1060, when a part 1090 forms in the injection mold 1020, a connection is formed between the first end 1030 of the valve-gate pin and the part 1090. Although a retention feature 1060 is typically consistent with the first end 1030 of the valve-gate pin, it will be appreciated that a retention feature 1060 may be offset from the first end 1030 of the valve-gate pin. The valve-gate pin 1005 traverses through a material delivery chamber 1095, through which material passes for the injection into the cavity 1040 of the injection mold. The valve-gate pin 1005 protrudes into the cavity 1040 through an aperture 1055 extending between the material delivery chamber 1095 and the cavity 1040.

A valve-gate pin 1005 as shown in FIG. 1A and FIG. 1B, and disclosed herein, may comprise a material composition of metal, composite materials such as nano-particle enhanced composites, plastics or other materials appreciated by those skilled in the art.

Figure 2:
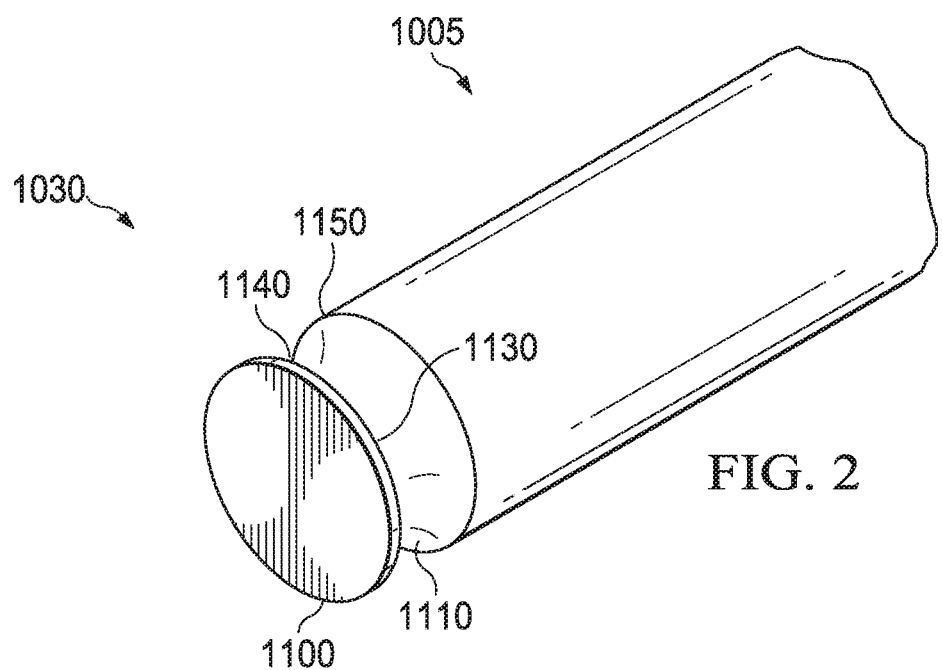

Certain embodiments of a valve-gate pin 1005, for example shown in FIG. 2, comprise a first end 1030 with a retention feature 1060. In such embodiments, the valve-gate pin 1005 comprises a round profile having a plurality of diameters. The retention feature comprises a first diameter 1100 consistent with the first end 1030 of the valve-gate pin and a second diameter 1110 offset from the first end 1030. In such embodiments, the second diameter 1110 is equal to the minor diameter 1130 of an annular recess 1140. In such embodiments, the second diameter 1110 of the valve-gate pin 1005 is equal with the major diameter 1150 of the annular recess. It will be appreciated, that in other embodiments, the minor diameter 1130 of the annular recess may not equal the second diameter 1110 of the valve-gate pin. Furthermore, in other embodiments, the major diameter 1150 of the annular recess may not equal the first diameter 1100 of the valve-gate pin. Alternatively, it will be further appreciated that a retention feature 1060 may comprise a feature providing differing form from the first diameter 1100 or the second diameter 1110 of the valve-gate pin 1005. Certain embodiments of a valve-gate pin may comprise a form which protrudes from the valve-gate pin.

Figure 3A:
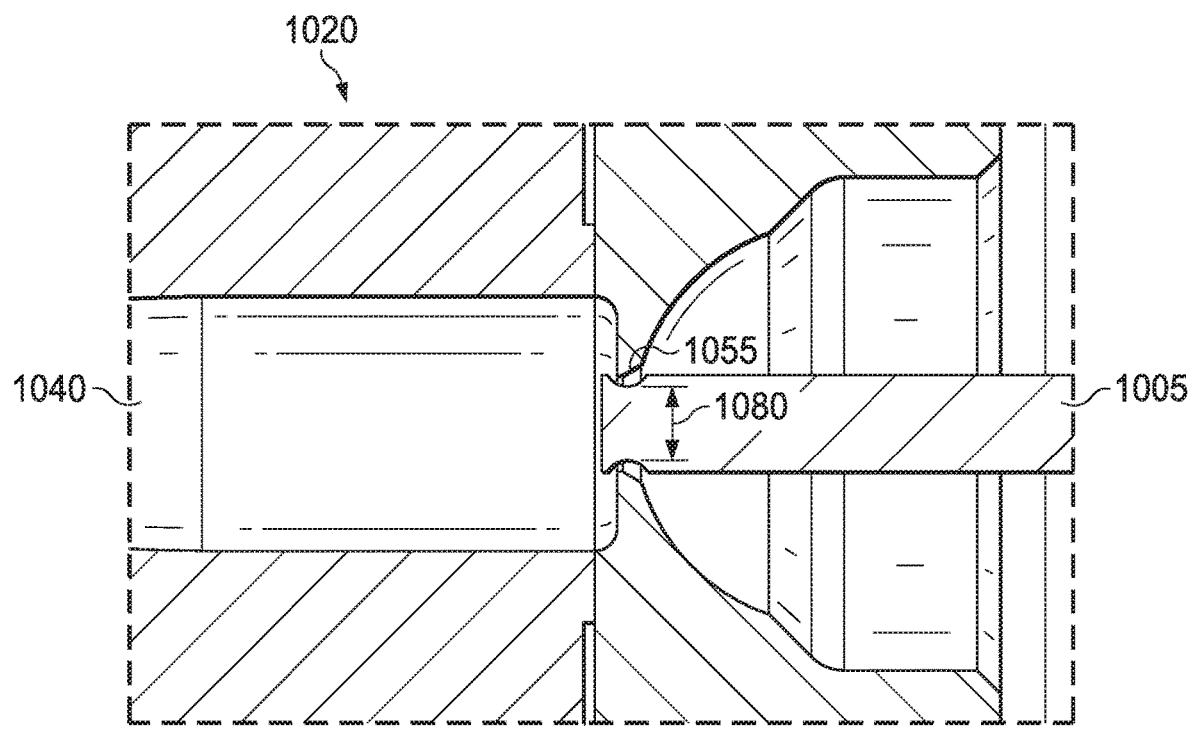
Figure 3B:
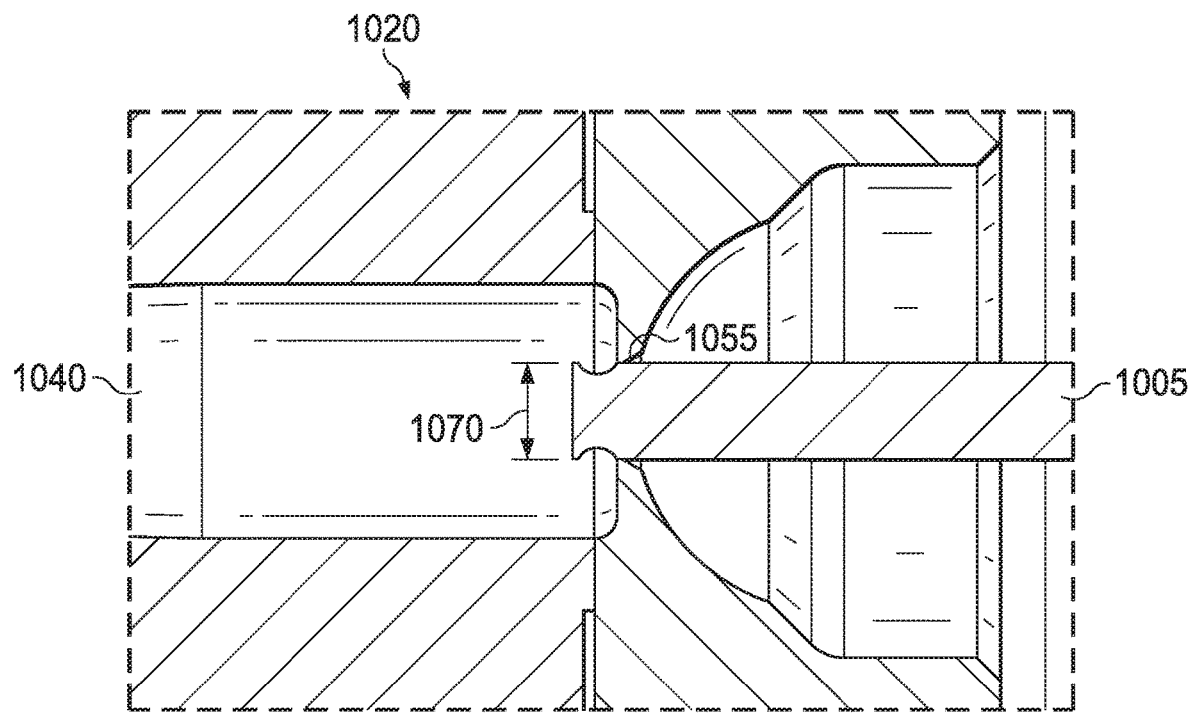

In embodiments of the present invention, a valve-gate pin 1005, for example shown in FIG. 3A, is longitudinally positionable to allow the extension and retraction of the valve-gate pin through an aperture 1055 and in relation to a cavity 1040 of an injection mold 1020. It will be appreciated that when a valve-gate pin 1005 is in an open position, a second dimension 1080 of a valve gate pin is configured to interface an aperture 1055 such that material for injecting into a cavity 1040 can bypass the valve-gate pin 1005 into the cavity 1040. In other embodiments of the present invention, for example shown in FIG. 3B, it will be appreciated that when a valve-gate pin 1005 is in a closed position, a first dimension 1070 is configured to be offset from an aperture 1055 such that material for injecting into a cavity 1040 cannot bypass the valve-gate pin 1005 into the cavity 1040.

Certain embodiments of an injection molding apparatus 1000, shown in FIG. 4, are used in conjunction with an injection mold 1020 comprising a first side 1010 and a second side 1050. The connection of a part 1090 to a valve-gate pin 1005 is accomplished by accounting for material properties such as thermal expansion characteristics, stress/strain considerations and elasticity of the selected material or composition used for manufacturing the part 1090. After forming, the part 1090 solidifies and contracts in volume causing the part 1090 to be affixed to a retention feature 1060 of the valve-gate pin. The connection between the part 1090 and valve-gate pin 1005 has a retention force defined by the force required, directed axially away from the valve-gate pin 1005, to break the connection between the part 1090 and the valve-gate pin 1005. This retention may be equal to or greater than the force needed to remove the molded part from the second side 1050 of the injection mold. When the first side 1010 is separated from the second side 1050, the retention force of the attachment between the part 1090 and the valve-gate pin 1005 pin extracts the part 1090 from the second side 1050 of the injection mold. If the retention force between the part 1090 and the valve-gate pin 1005 is equal to the retention forces between the part 1090 and the second side 1050 of the injection mold, the part releases from the second side 1050 and the first side 1010 of the injection mold simultaneously. If the retention between the part 1090 and the valve-gate pin 1005 exceeds the retention forces between the part 1090 and the second side 1050 of the injection mold, the part 1090 will be pulled away from the second side 1050 and remain in contact with the valve-gate pin. In certain embodiments, it may be required for a machine operator to manually extract, or a mechanical device to be used to extract, the part 1090 from the first side 1010 of the injection mold 1020 by applying enough force to break the connection between the part 1090 and the valve-gate pin 1005.

Certain embodiments of an injection molding apparatus 1000, shown in FIG. 5, comprise a valve-gate pin 1005 configured to retract and extend. It will be appreciated to those skilled in the art that such retraction and extension actions may be performed by linear actuating mechanisms 1065 such as, but not limited to, electro-mechanical actuators, mechanical actuators, hydraulic actuators, pneumatic actuators, piezoelectric actuators or other mechanisms known to those skilled in the art. Typically such actuating mechanisms interface with a second end 1035 of the valve-gate pin, but it will be appreciated that the connection between a valve-gate pin 1005 and an actuation mechanism may comprise alternate configurations as appreciated by those skilled in the art. In such embodiments, if the part 1090 is still connected to the valve-gate pin 1005 after the injection mold 1020 has been opened, the valve-gate pin 1005 may be retracted. The retraction of the valve-gate pin 1005 pulls the valve-gate pin 1005 from the part 1090 with enough force to exceed the retention force between the part 1090 and the valve-gate pin 1005. The retraction distance of the valve-gate pin 1005 may be of distance less than, equal to, or greater than the distance which the valve-gate pin 1005 protrudes into the cavity 1040 of the injection mold 1020. Once the part 1090 has been molded and released, the valve-gate pin 1005 may be extended into the cavity 1040 of the injection mold, and the first side 1010 of the injection mold mated with the second side 1050 of the injection mold prior to manufacturing another part 1090.

Figure 6A:
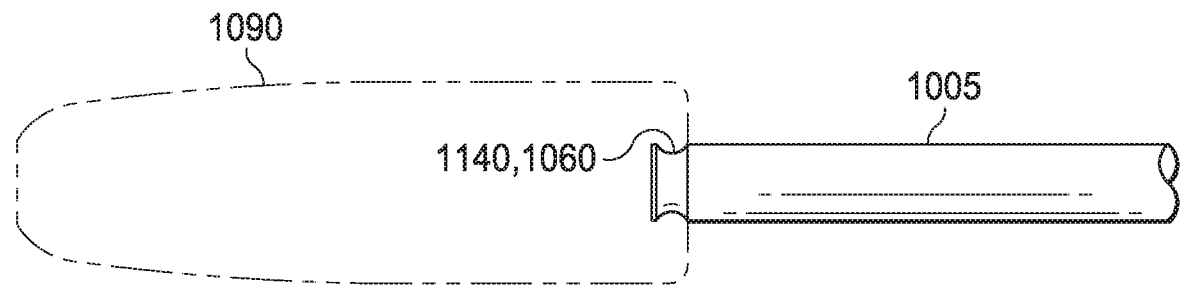
Figure 6B:
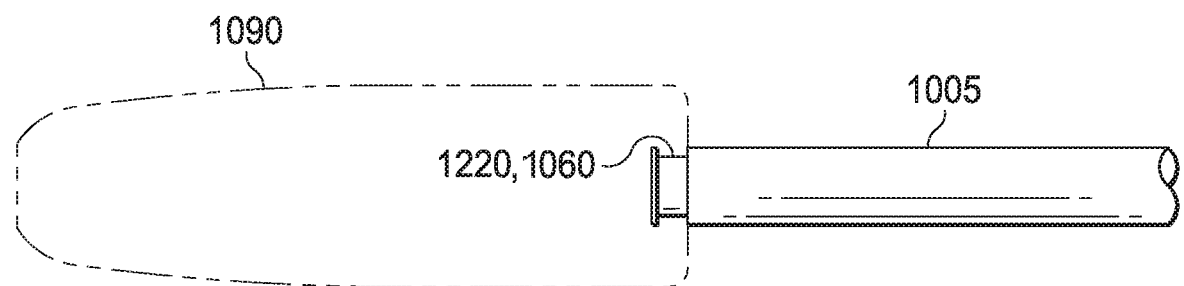
Figure 6C:
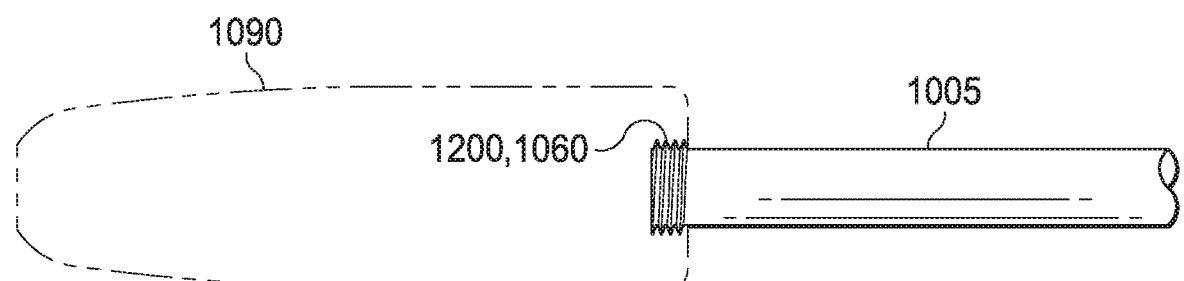
Figure 6D:
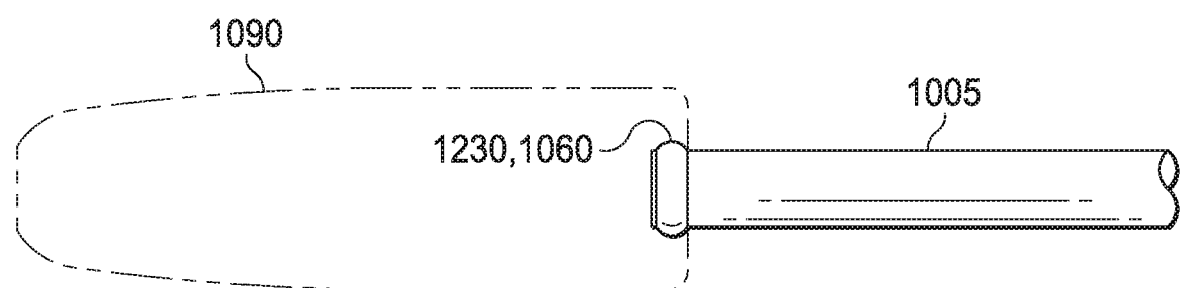

Certain embodiments of an injection molding apparatus 1000, as shown in FIG. 6A—FIG. 6D, comprising a valve-gate pin 1005 further comprise a retention feature 1060. In such embodiments, the retention feature 1060 may comprise at least one alternate form configured to provide retention of a part 1090. Such embodiments may comprise an annular recess having a semi-circular undercut 1140 (FIG. 6A), a rectangular undercut 1220 (FIG. 6B), a threaded feature 1200 (FIG. 6C), or a projecting feature 1230 (FIG. 6D). It will be appreciated that a retention feature may comprise any form that provides a retention force between a retention feature 1060 and a part 1090.

Figure 7:
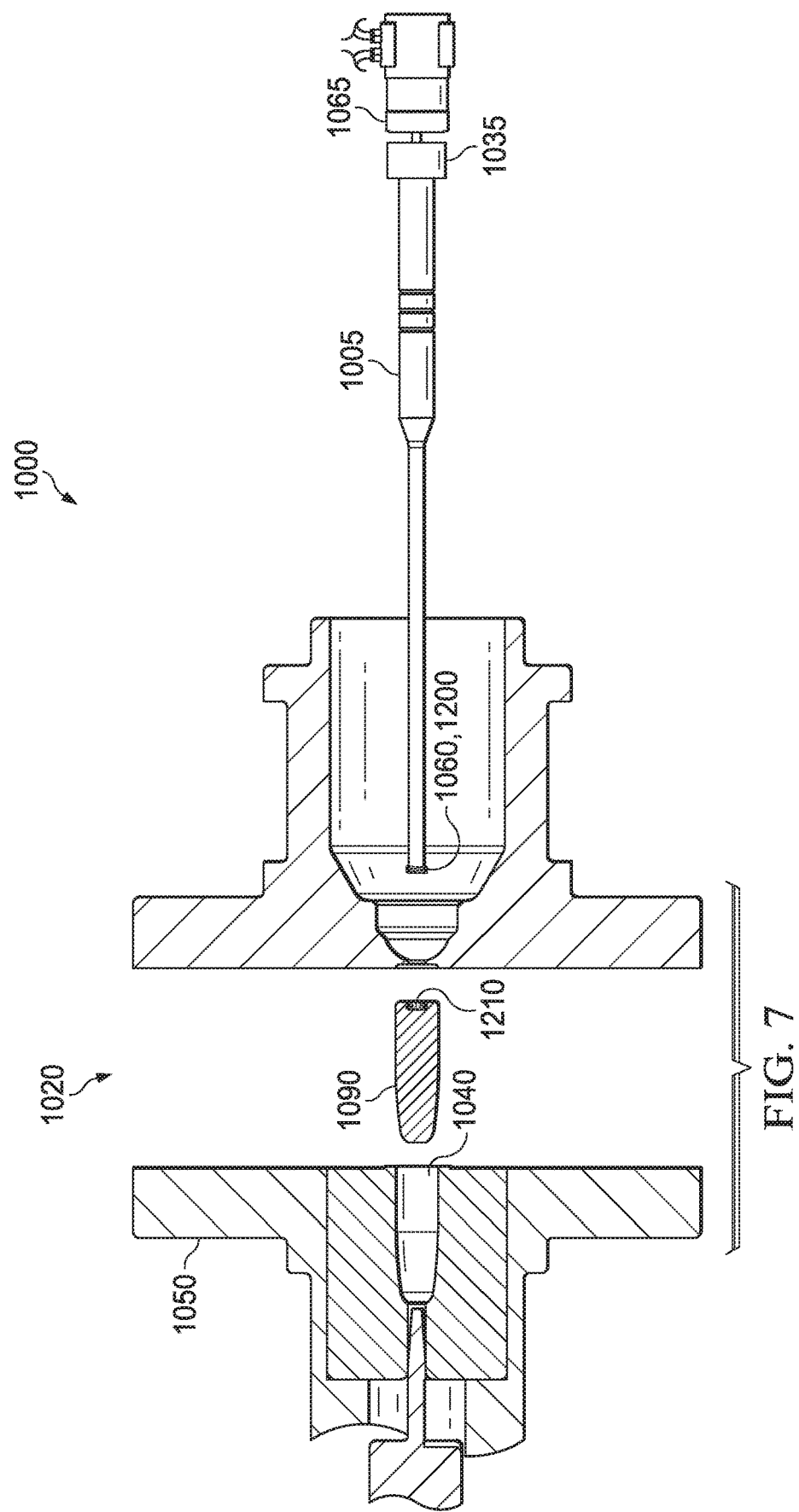

In certain embodiments of an injection molding apparatus 1000, shown in FIG. 7, a valve-gate pin 1005 comprises a retention feature 1060 having a threaded feature 1200. In such embodiments, the retention feature 1060 protrudes into the cavity 1040 of the injection mold 1020. When a part 1090 is manufactured, the part 1090 cools and creates an attachment between the part 1090 and the retention feature 1060 of the valve-gate pin. In such embodiments, it may be desired to actuate the valve-gate pin 1005 rotatively to release the part from the retention feature 1060 using an actuating mechanism 1065. Such actuation may be performed using rotative actuating mechanism 1065 independently or in conjunction with a linear actuating mechanism 1065 to retract the valve-gate pin 1005 from the cavity 1040 of the injection mold. Rotative actuating mechanisms 1065 include technologies such as but not limited to servo motors, stepper motors, hydraulic actuators, and pneumatic actuators. Typically, such actuating mechanisms interface with a second end 1035 of the valve-gate pin, but it will be appreciated that the connection between a valve-gate pin 1005 and an actuation mechanism may comprise alternate configurations as appreciated by those skilled in the art. When the part 1090 is released from the retention feature 1060 in such embodiments, the part 1090 exhibits a negative threaded feature 1210 as a negative form of the threaded feature 1200 of the retention feature 1060.

Figure 8:
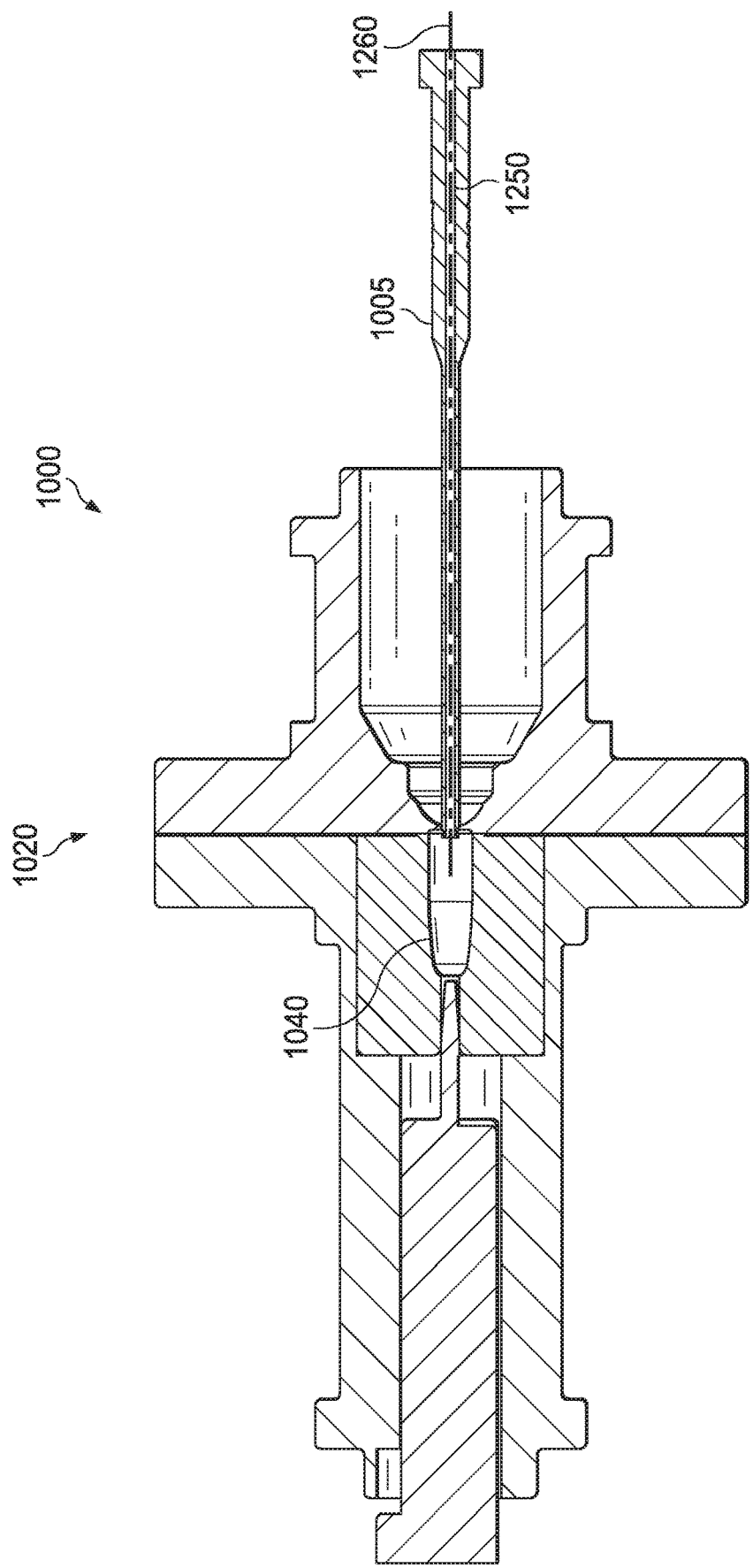

Certain embodiments of an injection molding apparatus 1000, shown in FIG. 8, comprise a valve-gate pin 1005 having a pathway 1250 longitudinally in the valve-gate pin 1005 such that such a pathway 1250 is exposed to the cavity 1040 of an injection mold 1020. Such a pathway 1250 and typically substantially consistent with a central axis 1260 of the valve-gate pin 1005. Such a pathway 1250 provides capability for processes including injection molding, gas-assist injection molding, and gas assisted part ejection.

Figure 9:
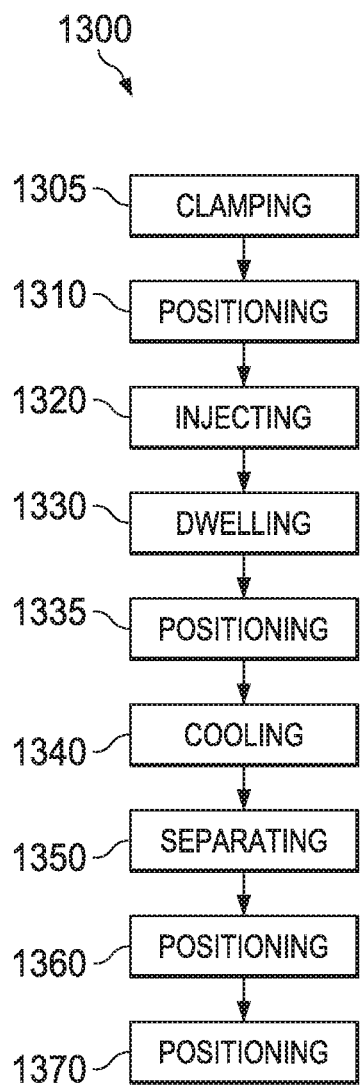
Figure 10:
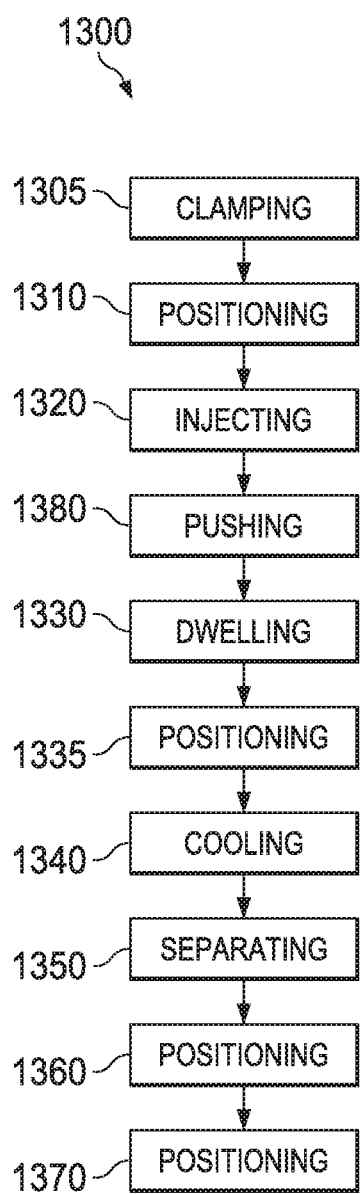

Certain embodiments of an injection molding process 1300, shown in FIG. 9, using injection valve-gate pins comprises: Clamping 1305 a first side of an injection mold to a second side of an injection mold creating a cavity between the first side of the injection mold and the second side of the injection mold, a first positioning step 1310 to position a valve-gate pin to an open position, injecting 1320 material into the cavity between the first side of the injection mold and the second side of the injection mold, dwelling 1330, maintaining the material substantially motionless under pressure, to ensure all voids of the cavity between the first side of the injection mold and the second side of the injection mold are filled, a second positioning step 1335 to position the valve-gate pin to a closed position, cooling 1340 to allow the part to properly cure and cool thereby creating a connection between the part and the retention feature of the valve-gate pin, separating 1350 the first side of the injection mold from the second side of the injection mold, and a third positioning step 1360 to retract the valve-gate pin away from the part thereby breaking the connection between the retention feature of the valve-gate pin and the part to release the part from the first side of the injection mold. Other embodiments surrounding an injection molding process 1300 comprise: a clamping 1305, a first positioning step 1310, an injecting step 1320, dwelling 1330, a second positioning step 1335, a cooling step 1340, and a separating step 1350. In such embodiments eliminating a third positioning step 1360, a part may be removed from a first side of an injection mold manually, mechanically, through the use of robotics or through the use of automated systems. In certain embodiments, breaking the connection between the retention feature of the valve-gate pin and the part may not release the part from the first side of the injection mold. In such embodiments, it may be desired to add fourth positioning step 1310 to position the valve-gate pin to force the part away from the first side of the injection mold. In certain embodiments of an injection molding apparatus which comprise a pathway in a valve-gate pin, as shown in FIG. 10, an additional step of pushing 1380 a fluid through the pathway may be desired. In such embodiments comprising a pushing step 1380, it will be appreciated that the pushing step 1380 may occur anywhere throughout the process dependent upon the intended purpose of the pushing step 1380. For instance, a pushing step may follow the injecting step for the introduction of a gas for gas-assist injection molding. However, a pushing step may occur following the dwelling step 1330 for the purposes of introducing a fluid—including a gas, liquid, powder or flowable solid—to encapsulate the fluid within the part. Furthermore, the pushing step may occur following the retracting 1360 step to provide gas-assisted ejection of a part from the injection mold. It will be appreciated by those skilled in the art that steps including, but not limited to, positioning 1310 the valve-gate pin and, retracting 1360 the valve-gate pin may occur at alternate stages of the process while remaining consistent with the inventive nature of the present invention.

In the foregoing specification, specific embodiments have been disclosed. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. The terms "first," "second," "proximal," "distal," etc., as used herein, are intended for illustrative purposes only and do not limit the embodiments in any way. Additionally, the term "plurality," as used herein, indicates any number greater than one, either disjunctively or conjunctively, as necessary, up to an infinite number. The benefits, advantages, solutions to problems, and any element(s) that may cause any benefit, advantage, or solution to occur or become more pronounced are not to be construed as a critical, required, or essential features or elements of any or all the claims.

While various embodiments of the present invention have been described in detail, it is apparent that modifications and alterations of those embodiments will occur to those skilled in the art. However, it is to be expressly understood that such modifications and alterations are within the scope and spirit of the present invention. Further, the invention(s) disclosed herein are capable of other embodiments and of being practiced or of being carried out in various ways. Various embodiments of the present invention(s) have been described in detail, it is apparent that modifications and alterations of those embodiments will occur to those skilled in the art. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

What is claimed is:

1. A method for the injection molding of a part comprising:
    clamping a first side of an injection mold to a second side of an injection mold creating a cavity therebetween;
    a first positioning step to position a valve-gate pin to an open position; injecting a first material into the cavity;
    a dwelling step to hold the injected material under pressure within the injection mold for a predetermined period of time;
    a second positioning step to position a valve-gate pin to a closed position, wherein a distal portion of the valve-gate pin protrudes into the cavity, the distal portion of the valve-gate pin having a retention feature comprising a diameter incongruent with a diameter of a shaft of the valve-gate pin resulting in an undercut, thereby creating a connection between the valve-gate pin and the part; and
    opening the injection mold, wherein the first side of the injection mold is separated from the second side of the injection mold,
    wherein the part produced resembles the cavity.

2. The method of claim 1, further comprising a third positioning step to retract the valve-gate pin, thereby breaking the connection between the valve-gate pin and the part.

3. The method of claim 2, further comprising a fourth positioning step following the third positioning step,
    wherein the fourth positioning step extends the valve-gate pin toward the cavity,
    thereby forcing the part away from the first side of the injection mold.

4. The method of claim 2, further comprising a pushing step comprising injecting a second material through a pathway in the valve-gate pin.

5. The method of claim 4, wherein the second material comprises a gaseous material.

6. The method of claim 1, wherein the first positioning step occurs prior to the clamping step.

7. The method of claim 1, wherein the diameter of the retention feature is larger than the diameter of the shaft of the valve-gate pin.

8. The method of claim 1, wherein the diameter of the retention feature is smaller than the diameter of the shaft of the valve-gate pin.

9. The method of claim 1, further comprising a cooling step following the second positioning step to allow the part to cool and create the connection between the part and the retention feature.

10. The method of claim 9, further comprising a third positioning step to retract the valve-gate pin thereby breaking a connection between the valve-gate pin and the part.

11. The method of claim 10, further comprising a fourth positioning step following the third positioning step,
    wherein the fourth positioning step extends the valve-gate pin, thereby forcing the part away from the first side of the injection mold.

12. The method of claim 11, wherein the third positioning step and the fourth positioning step are each performed a plurality of times alternately.

* * * * *